US012756416B2

(12) United States Patent
Yang et al.

(10) Patent No.: US 12,756,416 B2
(45) Date of Patent: Oct. 6, 2026

(54) COMPUTING DEVICE HAVING SENSOR WITH INTEGRATED ANTENNA

(71) Applicant: Google LLC, Mountain View, CA (US)

(72) Inventors: Zhenchao Yang, Bellevue, WA (US); Zheyu Wang, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 327 days.

(21) Appl. No.: 18/401,205

(22) Filed: Dec. 29, 2023

(65) Prior Publication Data

US 2025/0219669 A1 Jul. 3, 2025

(51) Int. Cl.
*H04B 1/3827* (2015.01)

(52) U.S. Cl.
CPC .................................... *H04B 1/385* (2013.01)

(58) Field of Classification Search
CPC .......... H01Q 1/273; H01Q 1/243; H01Q 1/38; H01Q 7/00; H01Q 9/0421; H01Q 21/28; H01Q 5/25; H01Q 1/48; H01Q 9/42; H01Q 9/0414; H01Q 9/0407; H01Q 13/10; H01Q 1/526; H01Q 21/065; H01Q 1/44; H01Q 1/24; H01Q 21/24; H01Q 21/30; H01Q 3/26; H01Q 5/35; H01Q 5/42; H01Q 1/241; H01Q 1/50; H01Q 5/378; H01Q 13/18; H01Q 5/335; H01Q 9/0457; H01Q 1/22;

(Continued)

(56) References Cited

U.S. PATENT DOCUMENTS

| | | | |
|---|---|---|---|
| 2012/0229361 A1 | 9/2012 | Goins et al. | |
| 2013/0029625 A1 | 1/2013 | Park et al. | |

(Continued)

FOREIGN PATENT DOCUMENTS

| | | | |
|---|---|---|---|
| WO | WO 2022186547 | 9/2022 | |
| WO | WO-2023003529 A1 * | 1/2023 | ............. A61B 5/681 |

OTHER PUBLICATIONS

Alimgeer et al., "Multiband Resonance Generation by Feed Manipulation in Microstrip Antenna.", Radar Methods & Systems Workshop RMSW '10, Institute of Electrical and Electronics Engineers Joint Chapter, Kiev, Ukraine, Sep. 21-23, 2010, 10 pages.

(Continued)

*Primary Examiner* — Golam Sorowar
(74) *Attorney, Agent, or Firm* — DORITY & MANNING, P.A.

(57) ABSTRACT

A wearable computing device can include an integrated electrode capable of functioning as a biometric sensor and an external antenna. The device can include a housing defining a cavity and having an upper surface and a lower surface. The electrode can be located on a non-skin contacting portion of the housing. Further, a feed structure connects the electrode to circuitry located within the cavity. The circuitry can include communications circuitry and biometric circuitry. Additionally, a decoupling network is positioned between the electrode and the circuitry so that radiofrequency signals are received from the electrode to the communications circuitry and electrical signals are received from the electrode to the biometric circuitry. Such an approach allows for simultaneous operation of the biometric circuitry and the communications circuitry connected to the electrode.

18 Claims, 8 Drawing Sheets

(58) Field of Classification Search
CPC .. H01Q 21/064; H01Q 1/2283; H01Q 1/2291; H01Q 1/422; H01Q 19/005; H01Q 5/357; H01Q 5/50; H01Q 9/04; H04B 1/385; H04B 1/3888; H04B 5/26; H04B 1/0343; H04B 5/79; H04B 1/0458; H04B 1/18; H04B 1/48; H04B 1/54; H04B 17/296; H04B 17/318; H04B 5/70; H04B 1/40; H04B 17/309; H04B 5/48; H04B 7/0608; H04B 7/0617; H04B 7/10
See application file for complete search history.

(56) References Cited

U.S. PATENT DOCUMENTS

2015/0380810 A1* 12/2015 Miura ...................... H01Q 9/04 703/1
2016/0233632 A1 8/2016 Scruggs et al.
2016/0351996 A1* 12/2016 Ou ...................... H01Q 1/2283
2019/0231216 A1 8/2019 Lee et al.
2020/0015701 A1* 1/2020 Wei ...................... A61B 5/332
2020/0229761 A1* 7/2020 Pandya ...................... A61B 5/681
2021/0083370 A1* 3/2021 Landherr ...................... H01Q 7/00
2022/0031184 A1 2/2022 Yoon et al.
2022/0361814 A1* 11/2022 Hinkola ...................... A61B 5/1112
2024/0072423 A1* 2/2024 Lee ...................... H01Q 9/0407
2024/0090834 A1* 3/2024 Li ...................... G06F 1/163
2024/0197249 A1* 6/2024 Koskimäki ...................... A61B 5/053
2024/0364002 A1* 10/2024 Gossner ...................... H01Q 1/50

OTHER PUBLICATIONS

Dhanabalan et al., "Flexible Compact System for Wearable Health Monitoring Applications.", Computers and Electrical Engineering, vol. 102, Sep. 2022, 12 pages.

* cited by examiner

COMPUTING DEVICE HAVING SENSOR WITH INTEGRATED ANTENNA

FIELD

The present disclosure relates generally to computing devices that monitor for biometric data and that permit communication with other devices or systems. More particularly, the present disclosure relates to a computing device having a sensor with an integrated antenna.

BACKGROUND

A computing device (e.g., a wearable computing device such as a wristwatch, ring, band, etc. or a non-wearable computing device such as a smartphone or tablet) can wirelessly communicate with other computing devices over a variety of wireless communication standards, such as long-term evolution ("LTE"), Wi-Fi, Bluetooth, and the like. The wireless communication standards can cover a variety of frequency bands. The computing device can include an antenna for such wireless communication.

The use of one antenna for communication over every wireless communication standard can be difficult. For example, various carriers and providers of wireless communication services can require certain connectivity standards from the wearable computing device that may not be met by using only one antenna to wirelessly communicate. Further, the sharing of a very limited number of antenna ports for multiple frequency bands leads to a complicated and lossy RF front-end (RFFE) architecture.

Furthermore, the use of only one antenna can make the computing device susceptible to antenna desensitivity (e.g., radio frequency chain desensitization) or degradation in antenna sensitivity due to noise sources, such as other electronic components of the computing device or other noise sources. Accessories for the computing device (e.g., metal bands for wearing the computing device around the wrist or covers for a smartphone or tablet), and the like can also change radiation patterns of an antenna and cause sensitivity degradation.

Moreover, the small size of many computing devices can make adding additional antennas difficult. Specifically, there is an extremely small volume available to antennas the smaller a device's footprint is. Additionally, the extremely small clearance between antennae, surrounding modules, and metal enclosures requires precise antenna clearances adjacent to metal components to maintain efficient antenna radiation performance in terms of efficiency and bandwidth. Typical solutions involve increasing the device size or decreasing the size of inner modules such as the battery, neither of which are desired.

Lastly, as more health sensor features are incorporated into wearable devices, antenna integration supporting the co-design of an antenna with other electronic system modules, leading to space and cost effectiveness, would be desirable.

SUMMARY

Aspects and advantages of embodiments of the present disclosure will be set forth in part in the following description, or can be learned from the description, or can be learned through practice of the embodiments.

In one aspect, the present disclosure is directed to a wearable computing device. The device includes a housing defining a cavity and having an upper surface and a lower surface; an electrode located adjacent a non-skin contacting portion of the housing, wherein the electrode functions as a biometric sensor and an external antenna; a feed structure connecting the electrode to circuitry located within the cavity, the circuitry comprising communications circuitry and biometric circuitry; and a decoupling network positioned between the electrode and the circuitry so that radiofrequency signals are received from the electrode to the communications circuitry and electrical signals are received from the electrode to the biometric circuitry.

In another expect, the external antenna can be configured to communicate over a wireless communication standard. Further, the wireless communication standard can be long term evolution (LTE), GPS, n255, WiFi, Bluetooth, or ultra-wideband (UWB).

In an additional aspect, the sensor can be a bioimpedance analysis sensor.

In one more aspect, the circuitry can further include impedance matching circuitry.

In yet another aspect, the electrode can have a length ranging from about 10 millimeters to about 30 millimeters and a height ranging from about 1 millimeter to about 5 millimeters.

In still another aspect, the electrode can have a thickness ranging from about 0.075 millimeters to about 0.4 millimeters.

In one more aspect, a distance between an outer surface of the housing and an outer surface of the electrode can range from about 0.5 millimeters to about 2 millimeters.

In another aspect, the electrode can be separated from the housing by an electrostatic discharge (ESD) material.

In an additional aspect, the wearable computing device can include a display screen, and the electrode can be located adjacent the non-skin contacting portion of the housing next to the display screen.

In yet another aspect, the wearable computing device can include an internal antenna disposed with the cavity. Further, the internal antenna can be configured to communicate over a plurality of wireless communications standards. In addition, the plurality of wireless communication standards can include long term evolution (LTE), GPS, n255, WiFi, Bluetooth, ultra-wideband (UWB), or a combination thereof.

In still another aspect, the external antenna can include a monopole antenna, a loop antenna, or a slot antenna.

In one more aspect, the electrode can function as the biometric sensor and the external antenna simultaneously.

In yet another aspect, the electrode can include a first portion and a second portion along its length, and the first portion and the second portion can be separated by a spacer. Further, in such a configuration, the external antenna can communicate over an ultra-wideband (UWB) communication standard.

A method for utilizing an electrode on a wearable computing device as a biometric sensor and an external antenna is also provided in the present disclosure. The method includes connecting the electrode to circuitry within a cavity of a housing of the wearable computing device via a feed structure, the circuitry comprising communications circuitry and biometric circuitry; positioning a decoupling network between the feed structure and the circuitry so that radiofrequency signals are received from the electrode to the communications circuitry and electrical signals are received from the electrode to the biometric circuitry; and positioning a dielectric material between the electrode and the housing.

In one aspect of the method, the communications circuitry and the biometric circuitry can operate simultaneously.

In another aspect, the electrode can be located on a non-skin contacting portion of the housing.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
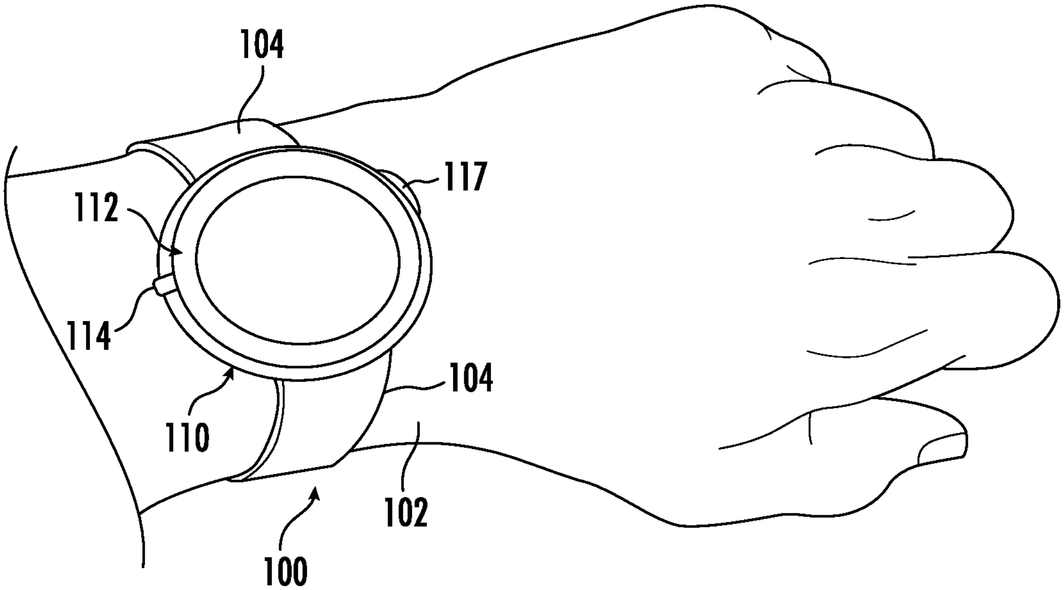
FIG. 1 depicts a perspective view of a computing device according to some implementations of the present disclosure.
Figure 2:
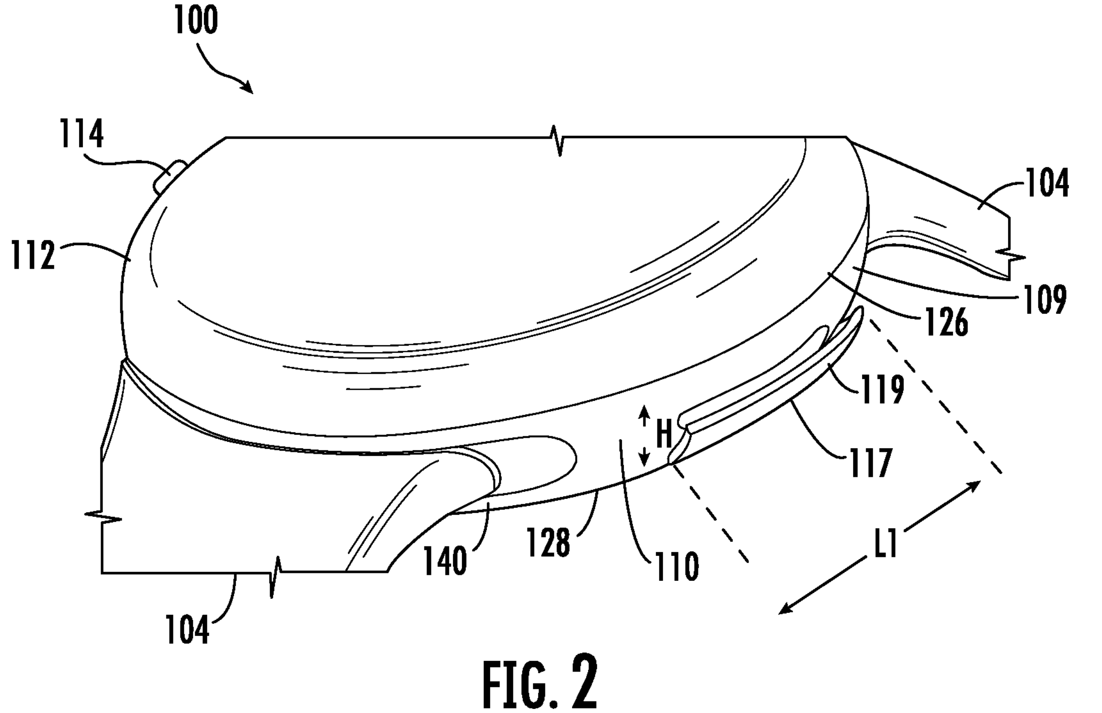
FIG. 2 depicts a side perspective view of a portion of a computing device according to some implementations of the present disclosure.
Figure 3:
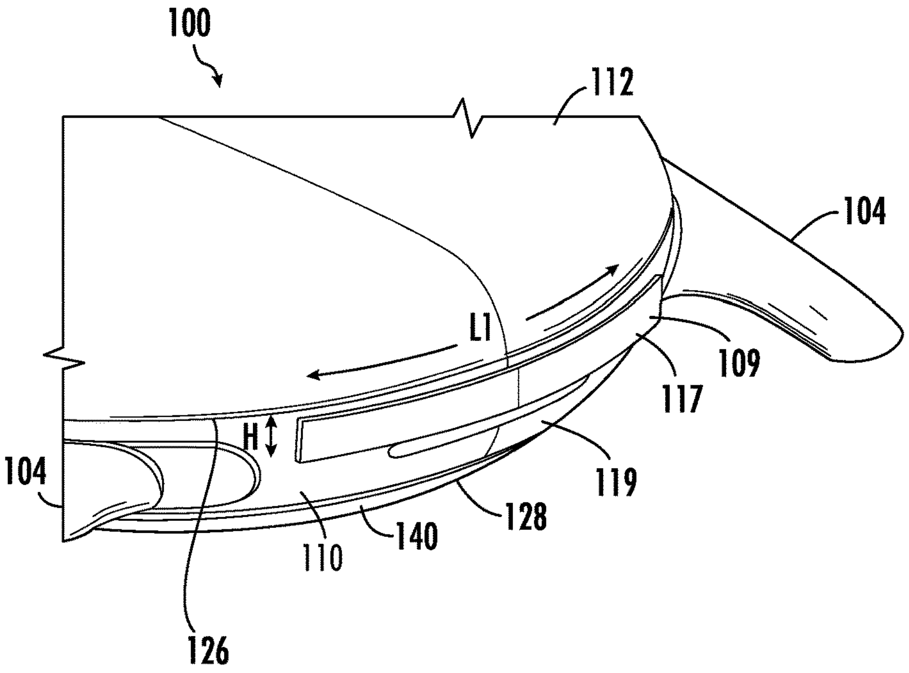
FIG. 3 depicts a side perspective view of a portion of a computing device according to some implementations of the present disclosure.

Reference numerals that are repeated across plural figures are intended to identify the same features in various implementations.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to a computing device that can be worn, for instance, on a user's wrist. However, it is to be understood that other wearable devices are also contemplated, such as, but not limited to, a band, a ring, etc. In addition, the present disclosure also contemplates implementing example aspects of the present disclosure in non-wearable devices, such as smartphones or tablets, which may also have limited spatial volume. The wearable computing device typically can include a housing and one or more internal antennas disposed within a cavity defined by the housing. In this manner, the wearable computing device can communicate with external devices (e.g., smartphones, tablets, etc.). However, the use of only internal antennas in wearable computing devices can risk not meeting carrier specifications for covering all communication frequency bands (especially low-band long-term evolution ("LTE") frequency bands), can cause antenna desensitivity, can cause interference with other functionality of wearable computing devices, and can limit wireless transmission of data to space restraints associated with the small internal footprint of wearable devices.

As such, the wearable computing device according to the present disclosure can include one or more additional external antennas positioned outside of the housing as part of an integrated electrode that also functions as a sensor, such as a biometric sensor. Such an arrangement can solve the problem of limited spatial volume within the cavity of the housing for additional antennas. The presence of the one or more external antennas integrated with the sensor in a single electrode also allows for antenna support over multiple bands with a cost effective hardware solution and efficiency with respect to available space for such hardware. In this regard, the integrated electrode of the present disclosure can support a single band, including, but not limited to long-term evolution (LTE), GPS, n255, WiFi 2.4/5G/6E, Bluetooth, and ultra-wideband (UWB) for wide area networks and local area networks.

In addition, the external antenna and the sensor are capable of functioning simultaneously due to the decoupling network and related circuitry associated with the electrode that is contained within a cavity of the housing. The decoupling network can be located on the main printed circuit board Moreover, the present disclosure contemplates an integrated electrode with a biometric sensor and external antenna structure that is well isolated from other antennas, which simplifies the multi-band radiofrequency front end (RFFE) circuitry and RF system efficiency. The integrated electrode contemplated by the present disclosure allows for coexistence of the biometric sensor system and the external antenna via a particular feed structure, proper electrostatic discharge (ESD) protection, a radiofrequency/biometric signal decoupling network, and impedance matching circuitry. Additionally, the present disclosure also contemplates an arrangement where the external antenna can resonate at multiple frequencies and support multiple bands depending on the feed structure location. Further, the antenna can work in various radiating modes including, but not limited to, monopole, loop, or slot depending in the structure loading conditions.

The wearable computing device can also include an electrostatically dissipative material between the housing and the external electrode that includes the biometric sensor and external antenna, where separating the external antenna from the housing and any other antennas contained therein provides the advantage of minimizing each antenna interfering with the other antenna. The electrostatic discharge (ESD) material can be any suitable material that can limit or control the build-up of static electricity, reducing the risk of electric discharge and associated hazards, such as electrical shock or damage to sensitive electronic components. The ESD material can include a dielectric material such as a polymer, a ceramic, a hydrocarbon based material, or a combination thereof. Specific but non-limiting polymers can include an acetal, an acrylic, a polycarbonate, a polyamide-imide, a polyimide, a polyvinyl chloride, a polyether ether ketone, a polyolefin, a fluoropolymer (e.g., polytetrafluoroethylene), or a combination thereof.

The wearable computing device can also include a feed structure that connects the biometric sensor and external antenna that are part of the integrated electrode to the circuitry within the housing of the wearable computing device. The circuitry can include one or more decoupling networks, one or more matching networks, switching devices, etc. as well as communications and sensor circuitry. It should be understood that the decoupling networks, matching networks, and any other circuitry, which can optimize both wireless RFFE and biometric sensor front-end paths, can be located on the main printed circuit board, a component (e.g., speaker, button, etc.) circuit board, etc. The feed structure can include any suitable fastener such as a pogo pin (e.g., a spring-embedded pogo pin), a booster pin, a spring, a clip, a compression spring, a solid pin/blade paired with a spring receptacle, or a combination thereof. Further, the feed structure can be molded into the ESD material for good water sealing and mechanical stability. Moreover, the location of the feed structure between the housing and the electrode can be adjusted to resonate at multiple frequencies and support multiple communication bands, including, but not limited to, those described above.

The wearable computing device can include a switching device (e.g., a double pole double throw switch) that can selectively couple one of the internal or external antennas to a wireless transmission/reception data path (a "primary communication path") and the remaining antennas to a wireless reception data path (a "diversity communication path"). The one or more processors can determine a signal strength of a signal received from the switching device (e.g., a signal from one of the internal and external antennas). Additionally, the one or more processors can receive a signal strength indicating the strength of the other signals (e.g., the signal from the remaining antennas). Based on the received signals, the one or more processors determines which of antenna or antennas should be used for wireless transmission and/or reception of data from the wearable computing device to other computing devices. For example, the one or more processors can determine that the external antenna that is part of the integrated electrode is receiving data more optimally than one of the internal antennas. Based on this determination, the one or more processors can generate a control signal for the switching device to switch to the external antenna for wireless data transmission if, for example, the wearable computing device is currently using the internal antenna for wireless data transmission.

By dynamically switching between different antennas, the providing better performance at the frequency band (e.g., low-band LTE) associated with the wireless communication standard for the cellular network can be selected. In this manner, a wearable computing device according to the present disclosure can meet wireless data carrier specifications and provide improved communications on the cellular network. For instance, all frequency bands associated with the wireless standard (e.g., LTE) for the cellular network can be covered and the dynamic switching capability can be used to select a better antenna for data transmission performance per frequency band which improves user experience when using the wearable computing device. Furthermore, a multi-antenna solution that can include both internal and external antennas allows the wearable computing device to combine received wireless data from multiple antennas, which allows for a better total isotropic sensitivity overall for the wearable computing device.

Referring now to the figures, FIGS. 1-5 depict a wearable computing device 100 according to some implementations of the present disclosure. As shown, the wearable computing device 100 can be worn, for instance, on an arm 102 (e.g., wrist) of a user. For instance, the wearable computing device 100 can include a band 104 and a housing 110. In some implementations, the housing 110 can include a conductive material (e.g., metal). In alternative implementations, the housing 110 can include a non-conductive material (e.g., a plastic material, a ceramic material).

The housing 110 can be coupled to the band 104. In this manner, the band 104 can be fastened to the arm 102 of the user to secure the housing 110 to the arm 102 of the user. Furthermore, the housing 110 can define a cavity 111 for containing various circuitry that can be located on a main printed circuit board 106, one or more electronic components 134, such as a speaker, that can be disposed on a printed circuit board 136, a first internal antenna 116, and a second internal antenna 118, which are discussed in more detail below.

In some implementations, the wearable computing device 100 can include a display screen 112. The display screen 112 can display content (e.g., time, date, biometrics, etc.) for viewing by the user. In some implementations, the display screen 112 can include an interactive display screen (e.g., touchscreen or touch-free screen). In such implementations, the user can interact with the wearable computing device 100 via the display screen 112 to control operation of the wearable computing device 100.

In some implementations, the wearable computing device 100 can include one or more input devices 114 that can be manipulated (e.g., pressed) by the user to interact with the wearable computing device 100. For instance, the one or more input devices 114 can include a mechanical button that can be manipulated (e.g., pressed) to interact with the wearable computing device 100. In some implementations, the one or more input devices 114 can be manipulated to control operation of a backlight (not shown) associated with the display screen 112. It should be understood that the one or more input device 114 can be configured to allow the user to interact with the wearable computing device 100 in any suitable manner. For instance, in some implementations, the one or more input devices 114 can be manipulated by the user to navigate through content (e.g., one or more menu screens) displayed on the display screen 112.

The wearable computing device 100 can include a first internal antenna 116, a second internal antenna 118, and a separator 120. The first internal antenna 116 can be an antenna configured to communicate over a plurality of different wireless communication standards (e.g., LTE, Wi-Fi, Bluetooth, etc.) for wide area networks (e.g., cellular networks), local area networks (e.g., Wi-Fi), or both. The first internal antenna 116 can be located at a first location within the cavity 111 of the wearable computing device 100, such as within an upper portion of the cavity 111 near a display element of the wearable computing device 100 (e.g., near a display screen 112). The second internal antenna 118 can be configured to communicate over a frequency band associated with a wireless communication standard (e.g., LTE) for a cellular network. The second internal antenna 118 can be located at a second location within the cavity 111 of the wearable computing device 100, such as within a lower portion of the cavity 111 near a biosensor hub 140 adjacent a skin-contacting surface of the wearable computing device 100.

The separator 120 can divide the cavity into a first portion in which the first internal antenna 116 is located (e.g., the first location) and a second portion in which the second internal antenna 118 is located (e.g., the second location). The separator 120, in some embodiments, can be a printed circuit board, such as printed circuit board for other electronic components of the wearable computing device (e.g., a processor, a memory, an input-output interface, a display interface circuit, a sensor circuit, and the like). Separating the first internal antenna 116 and the second internal antenna 118 with the separator 120 provides the advantage of minimizing interference by the first internal antenna 116 with the second internal antenna 118 and vice versa.

The wearable computing device 100 also includes an external electrode 117 that is integrated to include both a sensor (e.g., a biometric sensor such as bioimpedance analysis (BIA) sensor and an external antenna). The BIA sensor can be used to analyze body composition by applying a small alternating current through the body and measuring the impedance. Referring to FIGS. 2-5 in particular, the external electrode 117 can be located adjacent to a non-skin contacting portion of the housing 110. In some embodiments, the electrode 117 can be located near or next to the display screen 112. For instance, the electrode 117 can be located adjacent to an upper surface 126 of the housing 110. In other embodiments, the electrode 117 can be located near the biosensor hub 140, so long as the electrode 117 is not at risk of contacting the user's skin. For example, the electrode 117 can be located adjacent to a lower surface 128 of the housing 110. In any event, the electrode 117 is separated from the outer surface 109 of the housing 110 via ESD material 122. Further, the electrode 117 can have a thickness T1 ranging from about 0.075 millimeters to about 0.4 millimeters, such as from about 0.1 millimeters to about 0.35 millimeters, such as from about 0.15 millimeters to about 0.3 millimeters. Moreover, the distance T2 between the outer surface 109 of the housing 110 and an outer surface of the electrode 119 can range from about 0.5 millimeters to about 2 millimeters, such as from about 0.6 millimeters to about 1.5 millimeters, such as from about 0.65 millimeters to about 1 millimeter. Such dimensions strike a balance between the ability of the user to adequately contact the electrode for biometric sensing, such as with his or her fingers, without the electrode 117 extending too far from an outer surface 109 of the housing 110, where downward pressure on the wearable computing device 110 could cause the electrode 117 to come into contact with the user's arm/wrist 102. Moreover, the contemplated distance T2 extends far enough from the outer surface 109 of the housing 110 so that the user's fingers do not touch the housing 110's ground, which can lead to inaccurate sensor readings. Additionally, the electrode can have a length L1 ranging from about 10 millimeters to about 30 millimeters, such as from about 12 millimeters to about 28 millimeters, such as from about 15 millimeters to about 25 millimeters, as well as a height H ranging from about 1 millimeter to about 5 millimeters, such as from about 1.25 millimeters to about 4 millimeters, such as from about 1.5 millimeters to about 3 millimeters.

Figure 4:
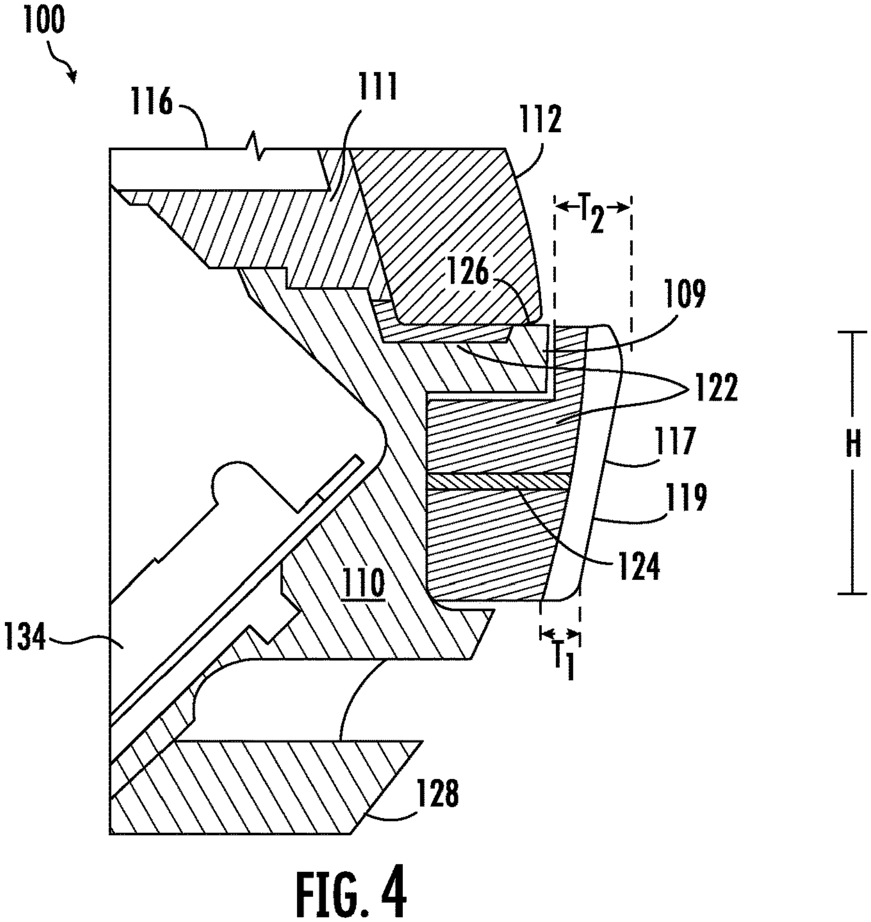
FIG. 4 depicts a cross-sectional view of a portion of the components of a computing device contained in a housing according to some implementations of the present disclosure.
Figure 5:
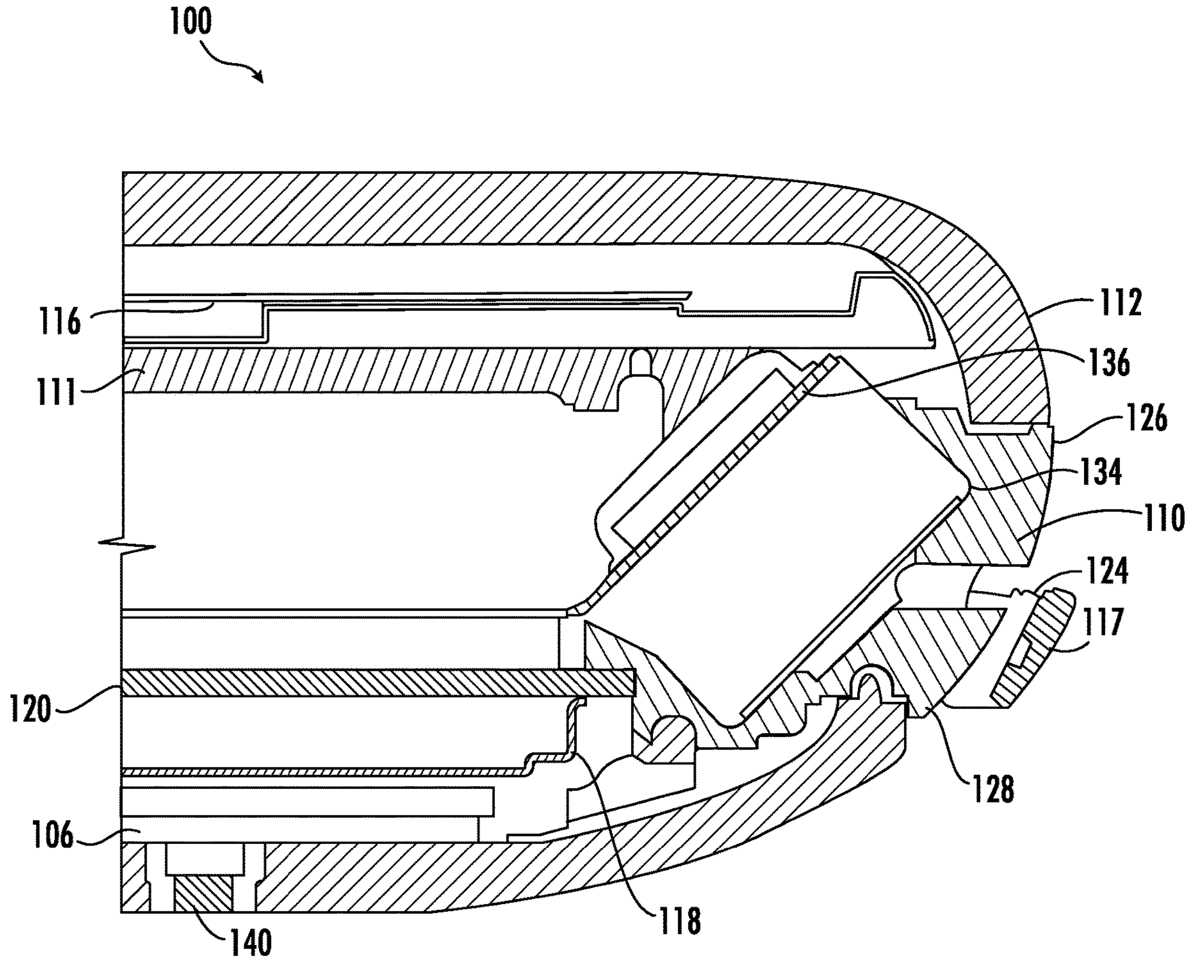
FIG. 5 depicts a cross-sectional view of a portion of the components of a computing device contained in a housing according to some implementations of the present disclosure.

Turning now to FIGS. 4 and 5, the feed structure 124 for the external electrode 117 is shown in more detail, where in FIG. 4, the electrode 117 is positioned adjacent or towards the upper surface 126 of the housing 110 (e.g., the non-skin contacting portion of the housing 110) next to the display screen 112, while in FIG. 5, the electrode 117 is positioned adjacent or towards the lower surface 128 of the housing 110 near the biosensor hub 140 (e.g., the skin-contacting portion of the housing 110). As shown, the feed structure 124 can be surrounded by an electrostatic discharge (ESD) material 122. In addition, as shown in FIG. 4, an additional section of ESD material 122 can separate the display screen 112 from an upper surface 126 of the housing 110.

Figure 6:
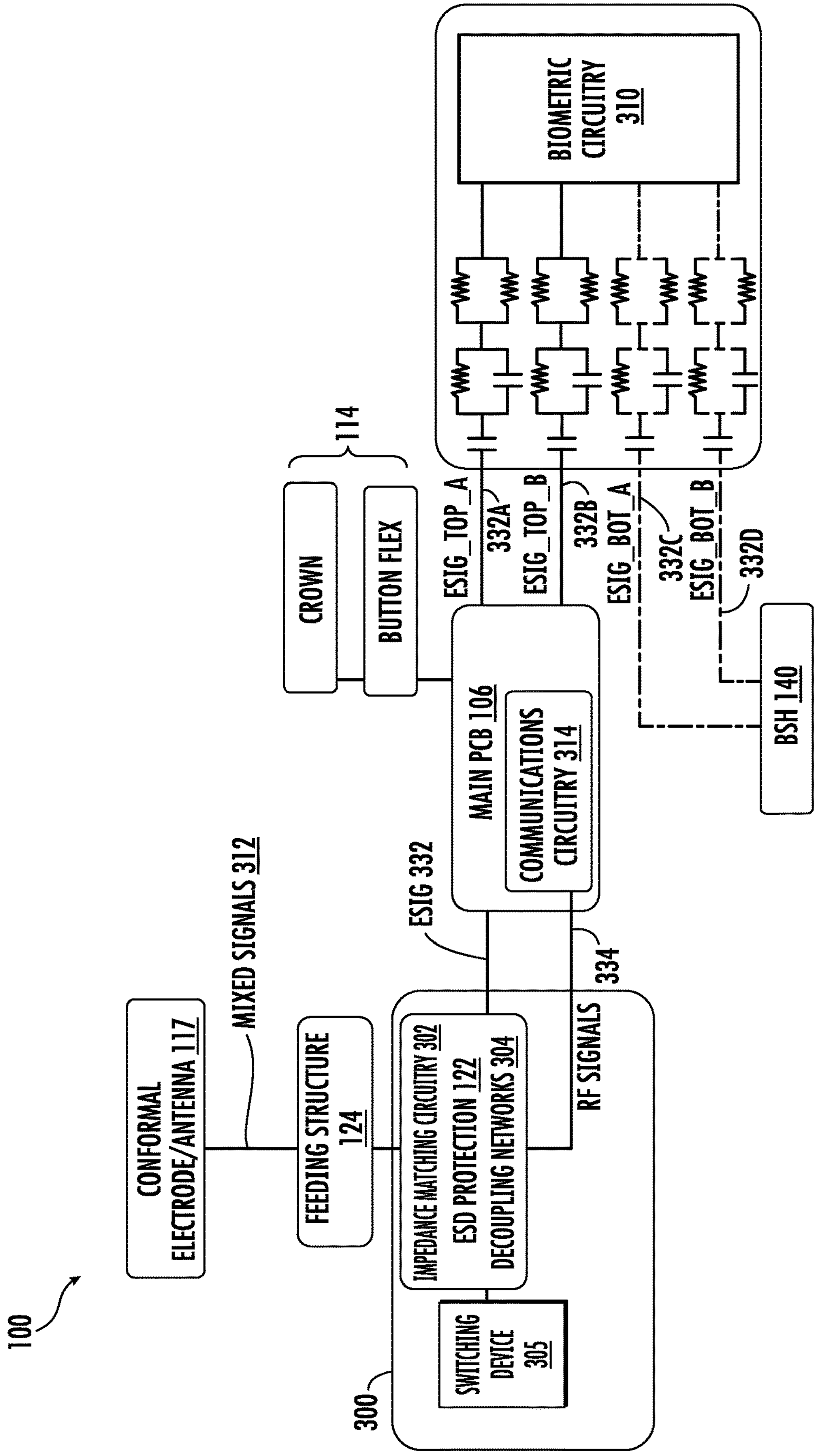
FIG. 6 depicts a block diagram of components of a computing device according to some implementations of the present disclosure.

FIG. 6 illustrates a partial block diagram of the various components and circuitry associated with the wearable computing device 100 according to some embodiments of the present disclosure. For instance, a main printed circuit board (PCB) 106 can be located within a cavity 111 of the housing 110 (see FIG. 5). The external integrated electrode 117 can be electrically coupled to the PCB 106 (or any other PCB, such as component PCB 136) via a feeding structure 124, impedance matching circuitry 302 associated with the external electrode's biometric sensor and/or antennas(s), decoupling network 204, and proper ESD protection via ESD material 122. Initially, a mixed radiofrequency and electrical signal 312 can be received via an electrode processing system 300 including a decoupling network 304, after which the mixed signal 312 can be separated into electrical signal 332 and radiofrequency 334. In addition, impedance matching circuitry 302 can be implemented to, for example, minimize signal reflection and/or dissipation. Then, the electrical signal 332 and radiofrequency signal 334 can reach the PCB 106, at which time the electrical signal 332 can be received by the biometric circuitry via 310 in the form of electrical signal 332A, and the radiofrequency signal 334 can be received by the communications circuitry 314. Further, an optional switching device 305 can be implemented to allow use of the antenna portion of the electrode 117 or the biometric sensor portion of the electrode 117, although it is to be understood that the present disclosure allows for the use of both features of the electrode 117 simultaneously. The switching device 305 can also be used to switch between multiple antenna signals, such as those from the external antenna associated with the electrode 117, first internal antenna 116, and second internal antenna 118 (see FIG. 5).

It should also be understood that the biometric circuitry 310 can receive multiple electrical signals 332B, 332C, 332D etc. from components such as an input device 114 such as a button/crown of the wearable device 100, as well as from the biosensor hub 140, which can be located at a lower surface 128 of the housing 110.

Figure 7:
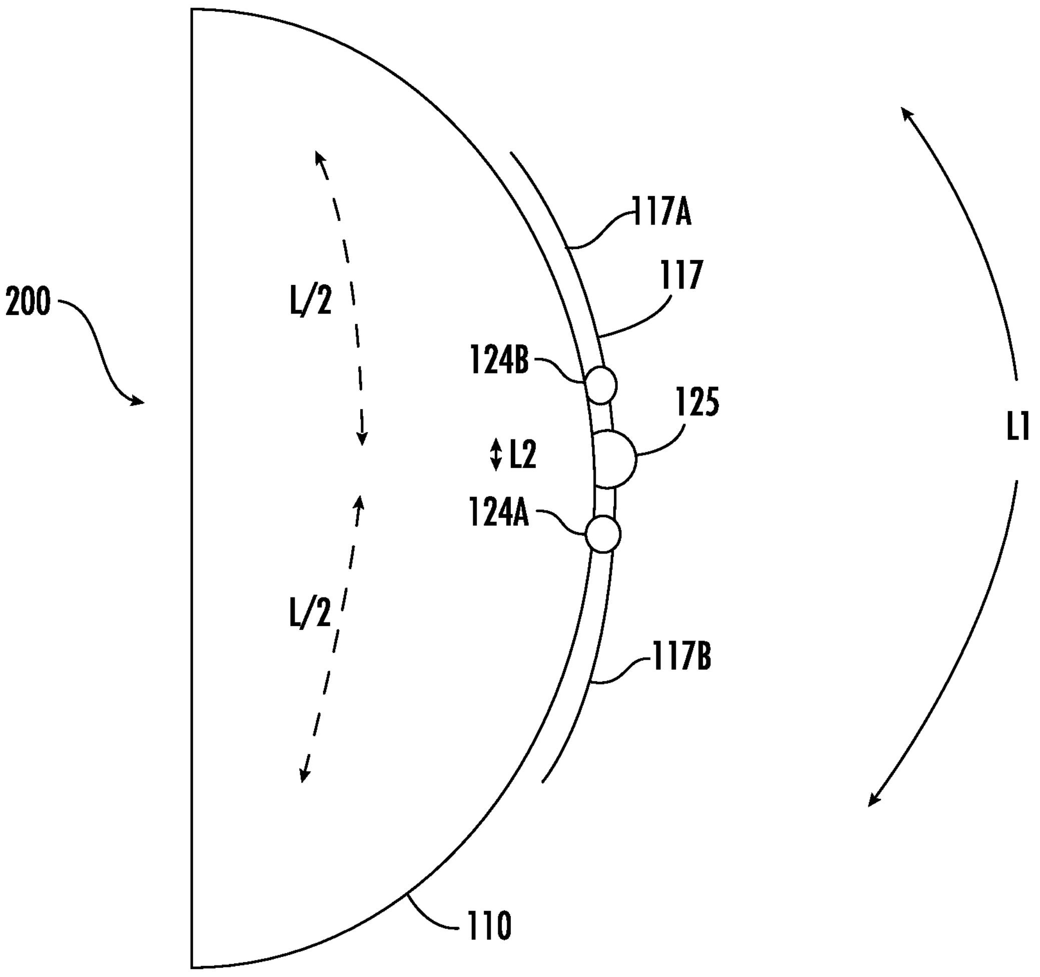
FIG. 7 depicts a cross-sectional view of a portion of a computing device according to some implementations of the present disclosure.

Discuss FIG. 7 illustrates a wearable computing device 200 according to another embodiment of the present disclosure in which the electrode 117 is divided along its length L1 into two halves L/2 separated by a spacer 125. Thus, each half L/2 can have a In such an embodiment, the electrode can be separated into a first portion 117A and a second portion 117B such that the electrode can function as a single biometric sensor and two external antennas defined by the first portion 117A and the second portion 117B. The spacer can have a length L2 that can be adjusted as necessary to minimize any radiofrequency interference between the first external portion 117A and the second external portion 117B that form the first external antenna and the second external antenna. The length L2 can range from about 0.25 millimeters to about 5 millimeter, such as from about 0.75 millimeters to about 2.5 millimeters, such as from about 1 millimeter to about 2 millimeters. Such a configuration allows for the integrated electrode 117 to communicate over an ultra-wideband (UWB) communication standard by enabling a one-dimensional arrival-of-angle (AOA) scan, where in typical wearable device configurations, there are not enough elements to form an array for a one-dimensional AOA scan. Further, because of the presence of the first portion 117A and the second portion 117B of the external electrode 117, the wearable device 200 also includes a first feed structure 124A and a second feed structure 124B for connecting the first portion 117A and the second portion 117B of the electrode 117 to the circuitry contained within the wearable computing device 200.

Figure 8:
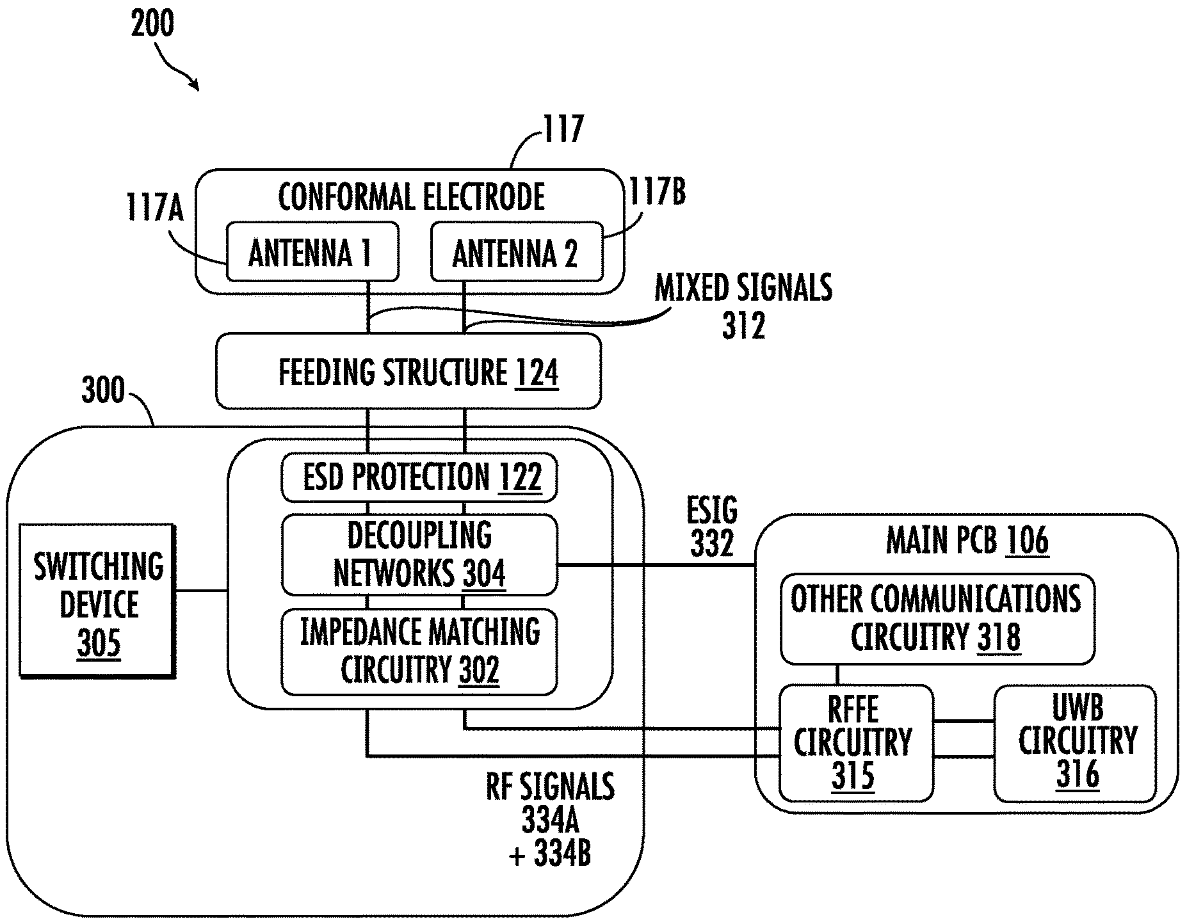
FIG. 8 depicts a block diagram of components of a computing device according to some implementations of the present disclosure.

FIG. 8 illustrates a partial block diagram of the various components and circuitry associated with the wearable computing device 200 according to the arrangement of FIG. 7. The components are similar to the block diagram of FIG. 6 except that there are two mixed signals 312 that are received via the feeding structure 124 from first portion 117A and second portion 117B of the external integrated electrode 117. For instance, a main printed circuit board (PCB) 106 can be located within a cavity 111 of the housing 110 (see FIG. 5). The first portion 117A and the second portion 117B of the electrode 117 can be electrically coupled to the PCB 106 (or any other PCB, such as component PCB 136) via a feeding structure 124, impedance matching circuitry 302 associated with the external electrode's biometric sensor and/or antennas, decoupling network 204, and proper ESD protection via ESD material 122. Initially, mixed radiofrequency and electrical signals 312 can be received via an electrode processing system 300 including a decoupling network 304, after which the mixed signal 312 can be separated into a single electrical signal 332 and two radiofrequency signals 334A and 334B. In addition, impedance matching circuitry 302 can be implemented to, for example, minimize signal reflection and/or dissipation. Then, the electrical signal 332 and radiofrequency signals 334A and 334B can reach the PCB 106, at which time the electrical signal 332 can be received by the biometric circuitry (not shown, refer to FIG. 6), and the radiofrequency signals 334A and 334B can be received by the communications circuitry, such as RFFE 315, after which UWB circuitry 316 can be utilized for enablement of a one-dimensional AOA scan. Additionally communications circuitry 318 can also be present on the PCB 306, such as for WiFi signals. Further, an optional switching device 305 can be implemented to allow use of the antenna portion of the electrode 117 or the biometric sensor portion of the electrode 117, although it is to be understood that the present disclosure allows for the use of both features of the electrode 117 simultaneously. The switching device 305 can also be used to switch between multiple antenna signals, such as those from the two external antennas associated with electrode 117 (e.g., from portions 117A and 117B), first internal antenna 116, and second internal antenna 118 (see FIG. 5).

Figure 9:
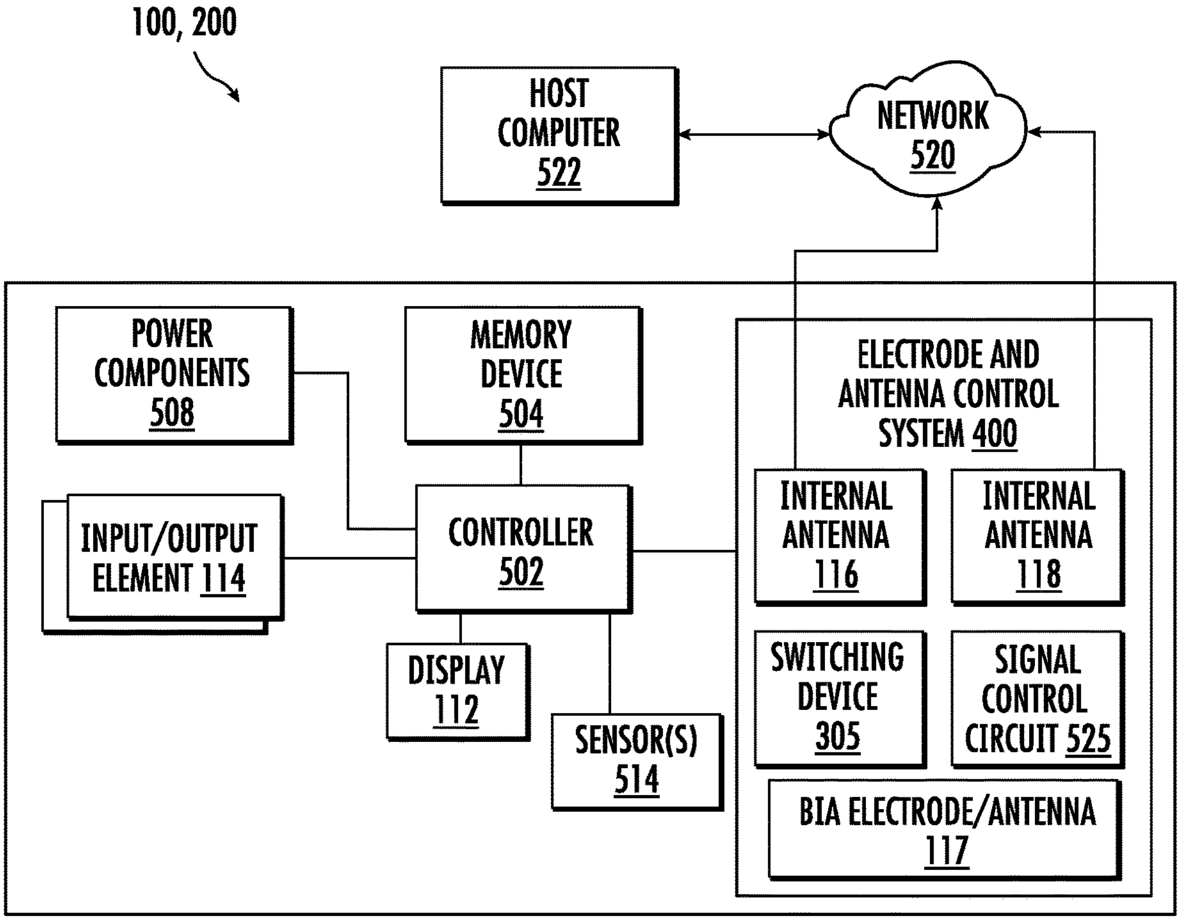
FIG. 9 depicts a block diagram of components of a computing device according to some implementations of the present disclosure.

Next, FIG. 9 more broadly depicts a block diagram of components of the wearable computing devices 100, 200 including an electrode and antenna processing system 400 according to some implementations of the present disclosure. In particular, as shown, the wearable computing device 100 may also include at least one controller 502 communicatively coupled to various sensor(s) 514 utilized on the device (including sensors that are part of the biosensor hub 140, the biometric sensor associated with the external integrated electrode 117, and others. Moreover, in an embodiment, the controller(s) 502 may be a central processing unit (CPU) or graphics processing unit (GPU) for executing instructions that can be stored in a memory device 504, such as flash memory or DRAM, among other such options. For example, in an embodiment, the memory device 504 may include RAM, ROM, FLASH memory, or other non-transitory digital data storage, and may include a control program comprising sequences of instructions which, when loaded from the memory device 504 and executed using the controller(s) 502, cause the controller(s) 502 to perform the functions that are described herein.

As would be apparent to one of ordinary skill in the art, the wearable computing device 100, 200 can include many types of memory, data storage, or computer-readable media, such as data storage for program instructions for execution by the controller or any suitable processor. The same or separate storage can be used for images or data, a removable memory can be available for sharing information with other devices, and any number of communication approaches can be available for sharing with other devices. In addition, as shown, the wearable computing device 100, 200 includes the display screen 112, which may be a touch screen, organic light emitting diode (OLED), or liquid crystal display (LCD), although devices might convey information via other means, such as through audio speakers, projectors, or casting the display or streaming data to another device, such as a mobile phone, wherein an application on the mobile phone displays the data.

The wearable computing device 100, 200 also includes one or more power components 508, such as may include a battery operable to be recharged through conventional plug-in approaches, or through other approaches such as capacitive charging through proximity with a power mat or other such device. In further embodiments, the wearable computing device 100, 200 can also include at least one additional I/O device 114 able to receive conventional input from a user. This conventional input can include, for example, a push button, touch pad, touch screen, wheel, joystick, keyboard, mouse, keypad, or any other such device or element whereby a user can input a command to the wearable computing device 100, 200. In another embodiment, the I/O device(s) 114 may be connected by a wireless infrared or Bluetooth or other link as well in some embodiments. In some embodiments, the wearable computing device 100, 200 may also include a microphone or other audio capture element that accepts voice or other audio commands. For example, in particular embodiments, the wearable computing device 100, 200 may not include any buttons at all, but might be controlled only through a combination of visual and audio commands, such that a user can control the wearable computing device 100, 200 without having to be in contact therewith. In certain embodiments, the I/O elements 114 may also include one or more sensor(s) 514 such as optical sensors, barometric sensors (e.g., altimeter, etc.), and the like.

In an embodiment, the wearable computing device 100, 200 can communicate with one or more external computers 522 over one or more networks 520 via, for example, the antenna that is part of the external integrated electrode 117 first internal antenna 116, the second internal antenna 118, or other wireless communication components.

The wearable computing device 100, 200 can also include an electrode and antenna processing system 400, which can include the external integrated electrode 117 that includes a biometric sensor and antenna, the first internal antenna 116, the second internal antenna 118, the optional switching device 305, and a signal control circuit 525. As mentioned above, the external antenna that is part of the integrated electrode 117 can communicate across a variety of communication frequencies, such as wide area networks and local area networks, including long term evolution (LTE), GPS, n255, WiFi, Bluetooth, or ultra-wideband (UWB). Further, the first internal antenna 116 can be an antenna designed to communicate across a variety of communication frequencies, such as wide area networks (e.g., LTE, Wi-Fi, Bluetooth, and other cellular networks), local area networks (e.g., Wi-Fi), or both. The second internal antenna 118 can be configured to communicate over a frequency band associated with a wireless communication standard (e.g., LTE) for a cellular network.

Signal control circuit 525 can be electrically coupled to the wireless data reception path and the one or more processors. In some embodiments, the signal control circuit 525 can receive signals from various communication paths associated with the antenna that is part of the external integrated electrode 117, the first internal antenna 116, and/or the second internal antenna 118. The signal diversity circuit 525 can determine the signal strength of various signals and provide the signal strengths to the one or more processors for comparison to determine which signal is optimal for a given function and then the one or more processors can generate a control signal for the switching device 305, which can then disconnect whichever antenna is currently connected to the communication path and connect the antenna associated with the optimal signal to the communication path.

Figure 10:
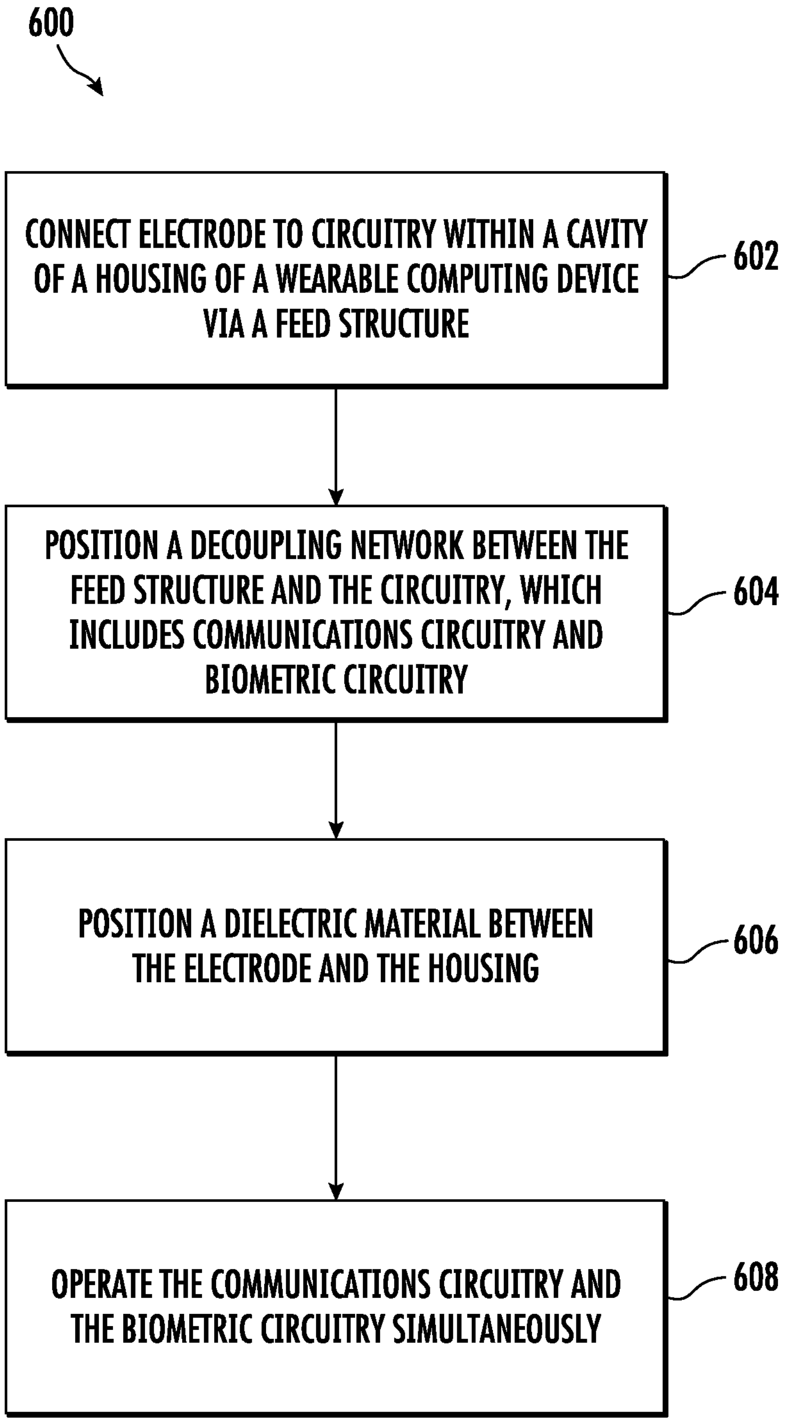
FIG. 10 depicts a flow diagram of a method for utilizing a sensor for monitoring biometric data and an antenna for wireless data transmission simultaneously according to some implementations of the present disclosure.

Next, FIG. 10 depicts a flow diagram of a method for utilizing a sensor for monitoring biometric data and an antenna for wireless data transmission simultaneously according to some implementations of the present disclosure. The method 600 may be implemented using, for instance, the electrode and antenna processing systems 300 and 400 discussed above with reference to FIGS. 6 and 8-9. In step 602, the method includes connecting the electrode to circuitry within a cavity of a housing of the wearable computing device via a feed structure, where the circuitry includes communications circuitry and biometric circuitry. In step 604, the method also includes positioning a decoupling network between the feed structure and the circuitry so that radiofrequency signals are received from the electrode to the communications circuitry and electrical signals are received from the electrode to the biometric circuitry Additionally, in step 606, the method also includes positioning a dielectric material between the electrode and the housing. Further, although FIG. 10 depicts steps performed in a particular order for purposes of illustration and discussion, those of ordinary skill in the art, using the disclosures provided herein, will understand that various steps of the method 600 or any of the other methods disclosed herein may be adapted, modified, rearranged, performed simultaneously, or modified in various ways without deviating from the scope of the present disclosure.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A wearable computing device comprising:

a housing defining a cavity and having an upper surface and a lower surface;

an electrode located adjacent a non-skin contacting portion of the housing, wherein the electrode functions as a biometric sensor and an external antenna;

a feed structure connecting the electrode to circuitry located within the cavity, the circuitry comprising communications circuitry and biometric circuitry; and a decoupling network positioned between the electrode and the circuitry so that radiofrequency signals are received from the electrode to the communications circuitry and electrical signals are received from the electrode to the biometric circuitry, wherein the electrode is separated from the housing by an electrostatic discharge (ESD) material, wherein the feed structure is surrounded by the ESD material between the housing and the electrode.

2. The wearable computing device of claim 1, wherein the external antenna is configured to communicate over a wireless communication standard.

3. The wearable computing device of claim 2, wherein the wireless communication standard comprises at least one of long term evolution (LTE), GPS, n255, WiFi, Bluetooth, or ultra-wideband (UWB).

4. The wearable computing device of claim 1, wherein the sensor is a bioimpedance analysis sensor.

5. The wearable computing device of claim 1, wherein the circuitry further comprises impedance matching circuitry.

6. The wearable computing device of claim 1, wherein the electrode has a length ranging from about 10 millimeters to about 30 millimeters and a height ranging from about 1 millimeter to about 5 millimeters.

7. The wearable computing device of claim 1, wherein the electrode has a thickness ranging from about 0.075 millimeters to about 0.4 millimeters.

8. The wearable computing device of claim 1, wherein a distance between an outer surface of the housing and an outer surface of the electrode ranges from about 0.5 millimeters to about 2 millimeters.

9. The wearable computing device of claim 1, further comprising a display screen, wherein the electrode is located adjacent the non-skin contacting portion of the housing next to the display screen.

10. The wearable computing device of claim 1, further comprising an internal antenna disposed with the cavity.

11. The wearable computing device of claim 10, wherein the internal antenna is configured to communicate over a plurality of wireless communications standards, the plurality of wireless communication standards comprising at least one of long term evolution (LTE), GPS, n255, WiFi, Bluetooth, ultra-wideband (UWB), or a combination thereof.

12. The wearable computing device of claim 1, wherein the external antenna comprises a monopole antenna, a loop antenna, or a slot antenna.

13. The wearable computing device of claim 1, wherein the electrode functions as the biometric sensor and the external antenna simultaneously.

14. The wearable computing device of claim 1, wherein the electrode includes a first portion and a second portion along its length, wherein the first portion and the second portion are separated by a spacer.

15. The wearable computing device of claim 14, wherein the external antenna is configured to communicate over an ultra-wideband (UWB) communication standard.

16. A method for utilizing an electrode on a wearable computing device as a biometric sensor and an external antenna, the method comprising:

connecting the electrode to circuitry within a cavity of a housing of the wearable computing device via a feed structure, the circuitry comprising communications circuitry and biometric circuitry;

positioning a decoupling network between the feed structure and the circuitry so that radiofrequency signals are received from the electrode to the communications circuitry and electrical signals are received from the electrode to the biometric circuitry; and positioning an electrostatic discharge (ESD) material between the electrode and the housing such that the ESD material separates the electrode from the housing, wherein the feed structure is surrounded by the ESD material between the housing and the electrode.

17. The method of claim 16, wherein the communications circuitry and the biometric circuitry are operated simultaneously.

18. The method of claim 16, wherein the electrode is located on a non-skin contacting portion of the housing.

* * * * *